(12) United States Patent
Sim et al.

(10) Patent No.: US 7,930,726 B2
(45) Date of Patent: Apr. 19, 2011

(54) IPTV SERVICE SYSTEM AND METHOD FOR EFFICIENT MULTICAST OF MPEG-TS

(75) Inventors: Jae Cheol Sim, Daejeon (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 656 days.

(21) Appl. No.: 11/947,670

(22) Filed: Nov. 29, 2007

(65) Prior Publication Data

US 2008/0134269 A1 Jun. 5, 2008

(30) Foreign Application Priority Data

Dec. 1, 2006 (KR) .................. 10-2006-0120694
Jul. 11, 2007 (KR) .................. 10-2007-0069811

(51) Int. Cl.
*H04N 7/173* (2006.01)
(52) U.S. Cl. .................. 725/114; 370/432; 370/390
(58) Field of Classification Search .................. None
See application file for complete search history.

(56) References Cited

U.S. PATENT DOCUMENTS

| | | | |
|---|---|---|---|
| 6,988,146 B1 * | 1/2006 | Magret et al. .............. | 709/238 |
| 2002/0184314 A1 * | 12/2002 | Riise .............. | 709/205 |
| 2005/0125840 A1 * | 6/2005 | Anderson et al. .............. | 725/118 |
| 2006/0159092 A1 * | 7/2006 | Boers et al. .............. | 370/390 |
| 2007/0086458 A1 * | 4/2007 | Narayanan et al. .............. | 370/390 |
| 2007/0274235 A1 * | 11/2007 | Boers et al. .............. | 370/256 |

FOREIGN PATENT DOCUMENTS

| | | | |
|---|---|---|---|
| KR | 1020060084676 A | | 5/2003 |
| KR | 2004-0066826 A | | 7/2004 |
| KR | 2005-0096700 A | | 10/2005 |
| WO | PCT/IB02/04808 | * | 5/2003 |
| WO | WO 03/045012 A1 | | 5/2003 |
| WO | WO 2004/064300 A2 | | 7/2004 |
| WO | WO 2004/064300 A3 | | 7/2004 |
| WO | PCT/US2004/008679 | * | 10/2004 |
| WO | WO 2004/086245 A1 | | 10/2004 |

* cited by examiner

*Primary Examiner* — Andrew Y Koenig
*Assistant Examiner* — Rong Le

(57) ABSTRACT

Provided are an IPTV service system and a method thereof. The IPTV service system includes: a headend, a set-top box, and a plurality of multicast routers. The headend assigns a multicast group address for each channel and assigns a source address for each PID with respect to an MPEG-TS and packetizes the MPEG-TS into a plurality of packet streams. The set-top box identifies a user-selected channel and the necessary elementary streams in the MPEG-TS for the selected channel, and requests selective reception of only packet streams corresponding to the selected channel and the necessary elementary streams from the plurality of packet streams. The plurality of multicast routers form a multicast path between the headend and the set-top box. Accordingly, while services such as a multi-angle service, a multi-lingual service, a mosaic EPG service, and a personalized EPG service are realized in one multicast control method together with viewing of a general broadcasting channel, efficient use of bandwidth can be achieved.

14 Claims, 7 Drawing Sheets

IPTV SERVICE SYSTEM AND METHOD FOR EFFICIENT MULTICAST OF MPEG-TS

The present application is based on, and claims priorities from the Korean Patent Application Number 10-2006-0120694 filed on Dec. 1, 2006 and the Korean Patent Application Number 10-2007-0069811 filed on Jul. 11, 2007, the disclosure of which is hereby incorporated by reference herein in its entirety

BACKGROUND OF THE INVENTION

1. Field of the Invention

The present invention relates to an Internet protocol television (IPTV) service system, and more particularly, to an IPTV service system for efficient multicast of a motion picture expert group-transport stream (MPEG-TS), and a method thereof.

The present invention has been derived from a research conducted as a part of information technology (IT) new growth power core technology development business by Ministry of Information and Communication, Republic of Korea (Project management No.: 2005-S-058-01, Project title: Development of Network/Service Control Technology in All-IP based Converged network).

2. Description of the Related Art

In general digital broadcasting, broadcasting data are transmitted according to MPEG-TS, which is a transmission standard format of the MPEG. The MPEG-TS is delivered to a set-top box connected to a customer premises terminal through a variety of broadcasting delivering networks such as a terrestrial TV network, a satellite TV network, and a cable TV network.

In the case of an IPTV service, broadcasting data are delivered through an IP network, which is different from the digital broadcasting in which broadcasting data are delivered through a terrestrial TV network, a satellite TV network, and a cable TV network.

However, since a current broadcasting station produces broadcasting data in a MPEG-TS format and transmits the same, the IPTV service merely carries the MPEG-TS from the broadcasting station over an IP network, with or without additional processing on the MPEG-TS.

FIG. 1 is a view illustrating the construction of a general MPEG-TS.

Referring to FIG. 1, the MPEG-TS includes a plurality of elementary streams (ES) which are audio, video, and data streams forming broadcasting data, respectively.

Also, the MPEG-TS includes a program association table (PAT) having packet identification (PID) values of a program map table (PMT), and the PMT which have a PID list of individual elementary streams such as a video stream and an audio stream.

Besides, program and system information (PSI) such as a master guide table (MGT), a virtual channel table (VCT), and a rating region table (RRT) for respectively defining a program guide, channel configuration information, and rating information can be inserted together to the MPEG-TS, and these tables are referred to as program and system information protocol (PSIP) data.

Each ES and table of PSIP data are identified with the PID, which is assigned for each stream and table. For example, the PAT is assigned PID=0, the PMT is assigned PID=1024, a video stream is assigned PID=501, an English version audio stream is assigned PID=601, and a Korean version audio stream is assigned PID=602.

A conventional IPTV service system adopts a multicast technology for an effective use of network bandwidth, a construction of which is illustrated in FIG. 2.

Referring to FIG. 2, the conventional IPTV service system includes: a broadcasting station 101 for producing broadcasting data in the form of MPEG-TS to transmit the same, a headend 102 for packetizing the MPEG-TS into IP packets for each broadcasting channel, multicast routers 103 and 104 for multicasting the packetized MPEG-TS for each broadcasting channel, and a set-top box 105 joining to a multicast group corresponding to a broadcasting channel selected by a user to receive the packetized MPEG-TS transmitted from the headend 102.

As illustrated in FIG. 3, the headend 102 performs packetization by segmentating the MPEG-TS into a predetermined size and then adding an IP packet header including a destination address and a source address. A multicast group address MGA corresponding to a channel is assigned as the destination address, and the address of the headend 102 that has performed the packetization is assigned as the source address SA.

Since various kinds of elementary streams are mixed in a packet output through the headend 102, it has been impossible for the set-top box 105 to selectively receive elementary streams of only a specific kind from the headend 102.

Consequently, the set-top box 105 receives elementary streams of even unnecessary.

In the conventional IPTV service system, because a set-top box 105 receives elementary streams of even unnecessary kinds, the network bandwidth usage is not efficient.

For example, when a user selects Korean on a broadcasting channel supporting a bilingual service of Korean and English, the set-top box 105 needs to decode and reproduce only Korean audio streams, but does not need to receive English audio streams.

However, according to the conventional art, since an element for blocking transmission of English audio streams is not provided, the sep-top box 105 constantly receives even unnecessary foreign language audio streams, wasting a bandwidth corresponding to the foreign language audio streams.

Also, the IPTV service supports a mosaic electronic program guide (EPG) service of simultaneously displaying a plurality of channels on one screen so that a user can select a desired channel more swiftly.

In the mosaic EPG, every TV channels to be appear on EPG screen are encoded as independent streams and then multiplexed into single MPEG-TS. This type of MPEG-TS, having multiple independent streams in it, is known as the multiple program transport stream (MPTS).

However, when the mosaic EPG is personalized, the TV channels to be included in the MPEG-TS varies with each user.

Since MPEG-TS should be constructed and transmitted for each individual, the MPEG-TS can not be multicast. Consequently, the efficient use of the network bandwidth can not be achieved.

SUMMARY OF THE INVENTION

According to an aspect of the present invention, there is provided an Internet protocol television (IPTV) service system for efficient multicast of a motion picture expert group-transport stream (MPEG-TS), the system comprising: a headend for assigning a multicast group address for each channel and assigning a source address for each packet identification (PID) with respect to the MPEG-TS, and packetizing the MPEG-TS into a plurality of IP packet streams; a set-top box for identifying a user-selected channel and necessary elementary streams in the MPEG-TS for the selected channel, and requesting selective reception of only packet streams corresponding to the selected channel and the necessary elementary streams from the plurality of packet streams; and a plurality of multicast routers forming a transmission path between the headend and the set-top box.

Here, the MPEG-TS corresponds to at least one channel, and comprises at least one of program and system information protocol (PSIP) data, video elementary streams, audio elementary streams, and data elementary streams. The unique PIDs are assigned for each table in PSIP data and elementary streams in the MPEG-TS.

The headend assigns only one source address to tables of PSIP data which comprising essential information for decoding MPEG-TS, although the tables have different PIDs, thereto.

Also, the headend packetizes the MPEG-TS into streams of IP packet with the predefined packet length or the predefined packet interval.

The set-top box obtains the multicast group address to join to a multicast group corresponding to the selected channel, and obtains source addresses corresponding to the necessary elementary streams in the MPEG-TS.

Also, the set-top box generates an Internet group management protocol (IGMP) report message having the multicast group address corresponding to the selected channel, and the source addresses corresponding to the necessary elementary streams to request data transmission.

According to other aspect of the present invention, there is An Internet protocol television (IPTV) method for efficient multicast of a motion picture expert group-transport stream (MPEG-TS), the method comprising: assigning, at a headend, a multicast group address for each channel and assigning a source address for each elementary stream with respect to the MPEG-TS to packetize the MPEG-TS into a plurality of packet streams; identifying, at a set-top box, a channel and necessary elementary streams selected by a user, and requesting joining to a multicast group corresponding to the selected channel and the necessary elementary streams; setting, at multicast routers, a multicast path corresponding to the multicast group; and selectively receiving, at the set-top box, only packet streams transmitted through the multicast path and corresponding to the selected channel and the necessary elementary streams.

The MPEG-TS comprises at least one of program and system information protocol (PSIP), video streams, audio streams, and data streams assigned unique packet identifications (PIDs), respectively.

The assigning source address for each elementary stream comprises assigning only one source address to tables of PSIP data which comprising essential information for decoding MPEG-TS, although the tables have different PIDs.

Also, the packetizing the MPEG-TS into a plurality of packet streams comprise packetizing with the predefined packet length or the predefined time interval.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
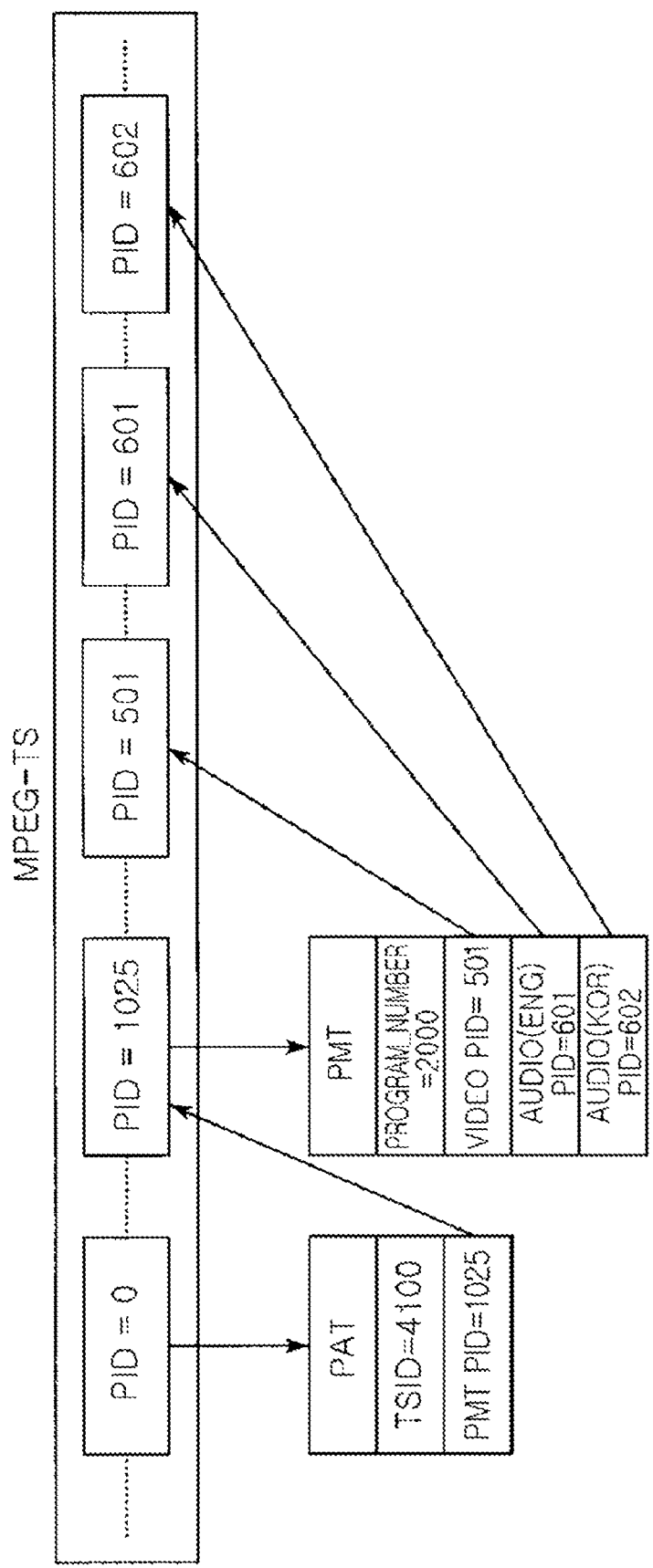
FIG. 1 is a view illustrating the structure of a general MPEG-TS.
Figure 2:
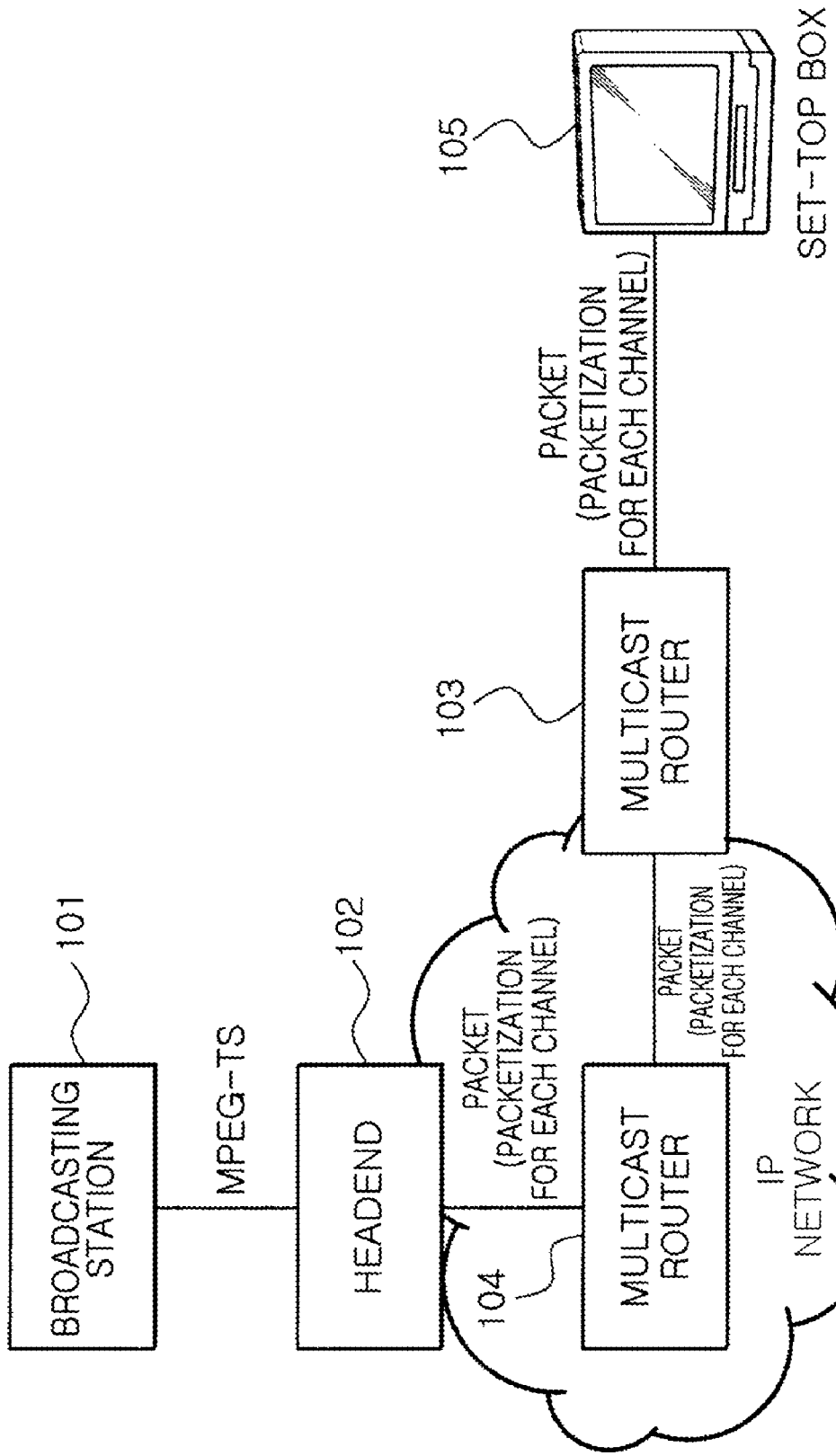
FIG. 2 is a view illustrating the components and their interfaces of an IPTV service system according to a conventional art.
Figure 3:
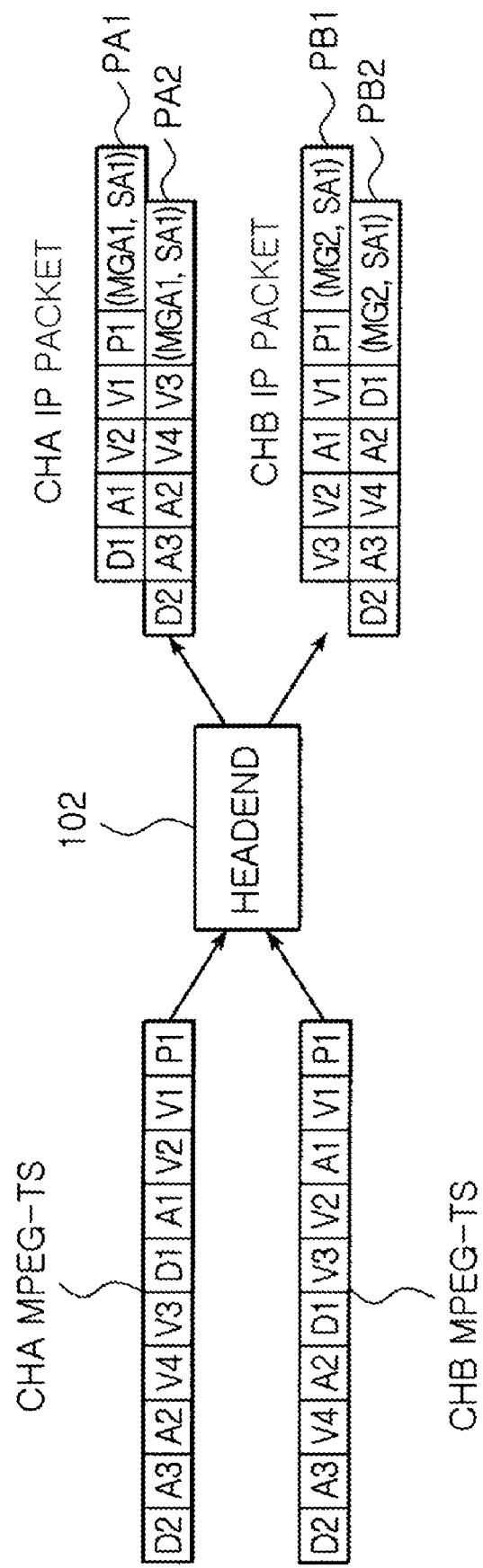
FIG. 3 is a view explaining in more detail the operation of a headend according to a conventional art.

Exemplary embodiments of the present invention that would be easily embodied by those of ordinary skill in the art will now be described in detail with reference to the accompanying drawings. However, in detailed description of operational principle according to the exemplary embodiments, well-known functions, well-known structures will not be described in detail to avoid ambiguous interpretation of the present invention.

Also, like reference numerals are used for like elements throughout the specification.

Figure 4:
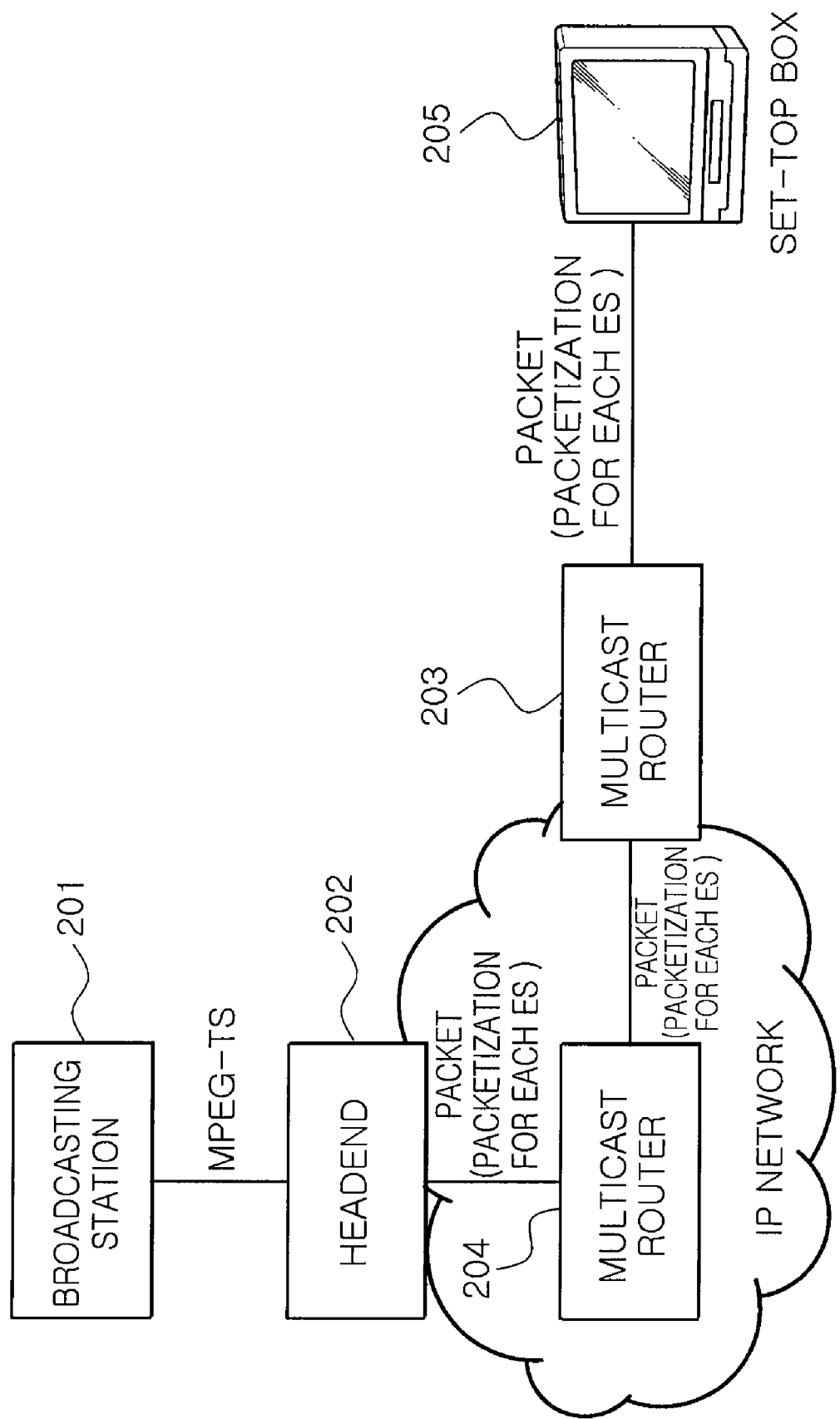
FIG. 4 is a view illustrating the components and their interfaces of an IPTV service system according to an embodiment of the present invention.

FIG. 4 is a view illustrating the components and their interfaces of an IPTV service system according to an embodiment of the present invention.

Referring to FIG. 4, the IPTV service system includes a broadcasting station 201, a headend 202, multicast routers 203 and 204, and a set-top box 205.

The broadcasting station 201 produces broadcasting data in MPEG-TS format and constantly transmits the MPEG-TS to the headend 202 existing on an IP network. At this point, the MPEG-TS can be a single program transport stream (SPTS) containing broadcasting data for one channel or an MPTS containing multiplexed broadcasting data for a plurality of channels.

The headend 202 packetizes the MPEG-TS received from the broadcasting station 201 into packets for each ES. That is, the headend 202 classifies the MPEG-TS for each PID, and assigns a destination address in the conventional way while assigning a source address differently for each PID to perform the IP packetization.

The set-top box 205 allows a user to select not only a channel but also the elementary streams the user desires to receive. Also, the set-top box 205 transmits an Internet group management protocol (IGMP) report message having a multicast group address (MGA) and source addresses (SAs) corresponding to a channel and the elementary streams selected by the user to an adjacent multicast router 203 to join to a multicast group corresponding to the address pair of the MGA and the SAs selected by the user.

Accordingly, the set-top box 205 of the present invention joins to the multicast group corresponding to the channel selected by the user to receive only the elementary streams selected by the user. That is, even in the case where the user accesses a broadcasting channel providing a bilingual service including Korean and other foreign languages, the user can receive only Korean audio streams.

The multicast routers 203 and 204 are located in the IP network and divided into the multicast router 203 (referred to as an edge router) to which the set-top box 205 is connected, and the multicast router 204 (referred to as a router on a transmission path) located on a transmission path inside the IP network.

The edge router 203 includes a multicast control protocol such as an IGMP V3 protocol. The edge router 203 analyzes a multicast group address and source addresses contained in an IGMP report message. When an address pair of an MGA and SAs has already been registered, corresponding elementary streams are being received already. Accordingly, only a transmission path between the edge router 203 and the set-top box 205 is set. When the address pair of the MGA and SAs is new one, the edge router 203 outputs a PIM-join message to the multicast router 204 located adjacent in the direction of the source address to request reception of the corresponding elementary streams.

The router 204 on the transmission path includes a multicast router protocol such as protocol independent multicast-source-specific multicast (PIM-SSM), and forms a multicast tree from the headend 202 to the edge router 203 while relaying a PIM-join message using the multicast router protocol.

Figure 5:
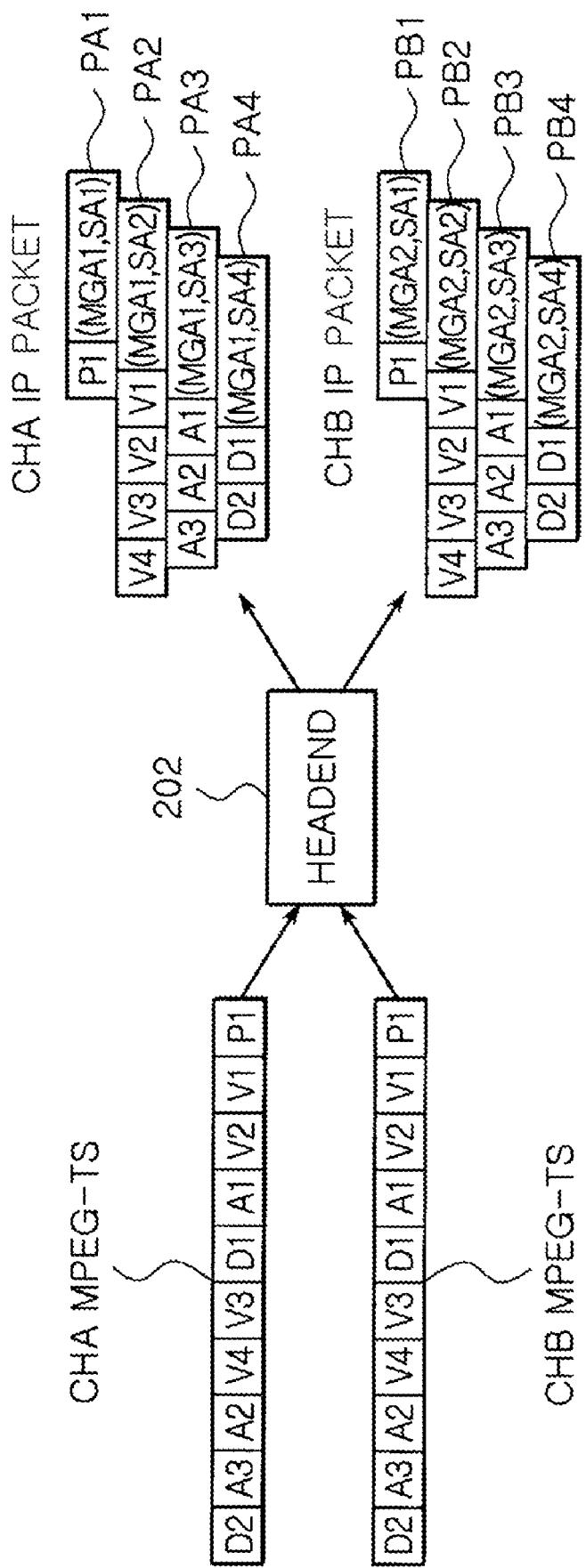
FIG. 5 is a view explaining in more detail the operation of a headend according to an embodiment of the present invention.

FIG. 5 is a view explaining in more detail the operation of a headend according to an embodiment of the present invention.

Referring to FIG. 5, the headend analyzes the MPEG-TS received from the broadcasting station 201 to sequentially collect ESs and PSIP data inside the MPEG-TS for each PID.

And, when the collected streams become a predetermined size or more, the headend adds a packet header including a destination address MGA and a source address SA to the MPEG-TS to packetize the MPEG-TS into IP packets, and outputs the same.

The source addresses SA1, SA2, SA3, and SA4 recorded on the packet header are virtual source addresses assigned differently for each PID, that is, each elementary stream, and the destination address MGA is a multicast group address corresponding to each channel as in the conventional art.

An MPEG-TS of a channel CHA are packetized into an IP packet PA1 including a PSIP data P1, an IP packet PA2 including video elementary stream data V1, V2, V3, and V4, an IP packet PA3 including audio elementary stream data A1, A2, and A3, and an IP packet PA4 including data elementary stream data D1 and D2. These IP packets are assigned different source addresses SA1, SA2, SA3, and SA4. The above description is likewise applied to an MPEG-TS of a channel CHB.

Since IP packets output through the headend of the present disclosure have the same destination address MGA for each broadcasting channel but have different source addresses S1, S2, S3, and S4, respectively, for each elementary stream, the user can select not only a broadcasting channel but also the elementary streams the user desires to receive.

The source addresses of the present invention can be reused for the different channel. That is, the source address SA2 assigned to a video elementary stream of the channel A CHA can be assigned to a video elementary stream of the channel B CHB.

Also, ESs or PSIP data having a different PID can be bound in one packet depending on a stream characteristic.

For example, a PAT, a PMT, and a RTT classified as PSIP data have different PIDs, but all of them have a common characteristic of providing information necessary for stream analysis. In this case, they can be bound in IP packet having one source address.

Also, a method of performing packetization by the predetermined packet size and a method of performing packetization by the predetermined time interval are used together because each ESs has a different bandwidth requirement.

For example, since a video stream requires a wider bandwidth than that of an audio stream in general, when the packetization is performed only on a size basis of the video stream, there can be a problem that a packet including a video stream is transmitted every 1 second, but a packet including an audio stream is transmitted every 5 seconds.

According to the present invention, elementary streams of a specific kind are transmitted every predetermined time interval regardless of a packet size to prevent the above-described limitation.

Figure 6:
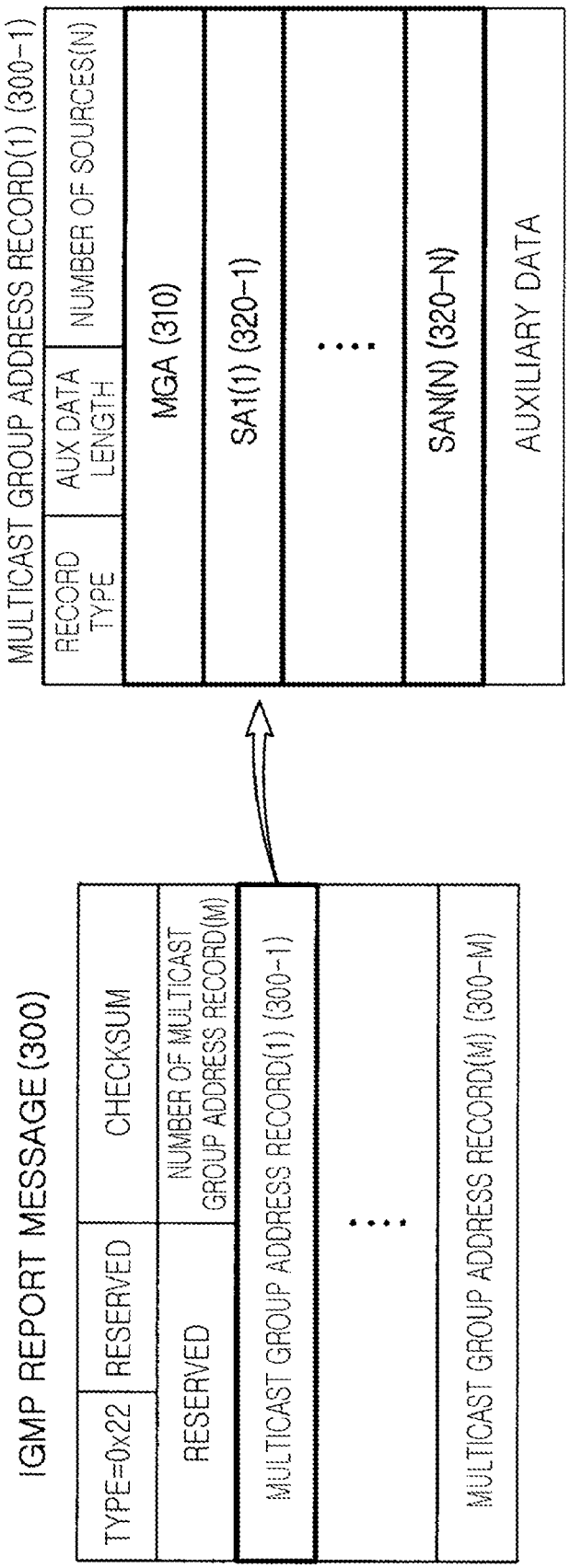
FIG. 6 is a view illustrating an IGMP report message generated by a set-top box according to an embodiment of the present invention.

FIG. 6 is a view illustrating an IGMP report message generated by a set-top box according to an embodiment of the present invention.

Referring to FIG. 6, the IGMP report message 300 includes one or more multicast group address record 300-1 to 300-M. Each multicast group address record 300-1 includes one multicast group address (MGA) 310, and a plurality of source addresses SA1 to SAN, respectively.

Therefore, the set-top box of the present invention can select a specific channel with the multicast group address (MGA), and selectively receive only the necessary elementary streams with specifying the plurality of source addresses SA1 to SAN.

For performing the above-described operation, the set-top box of the present invention should be aware of a multicast address and source addresses corresponding to each channel in advance. The multicast address and the source addresses can be known using the service discovery and selection procedures, which is known technology.

The service discovery and selection is roughly divided into four methods.

A first method accesses a predetermined channel to obtain PSIP information such as PAT, PMT, and VCT. Since a PSIP table includes a descriptor field for each channel and its component ESs, a multicast group address or a source address are recorded on the descriptor field.

A second method accesses the specific channel such as an EPG channel providing separate service information in the form of a data ES or an application program.

A third method accesses a predetermined server using hypertext transfer protocol (HTTP) or a predetermined protocol independently of a broadcasting channel.

A last method uses a session announcement protocol (SAP) supported by a multicast router. The SAP is a protocol designed for providing information regarding streams that are currently available at the multicast router.

Figure 7:
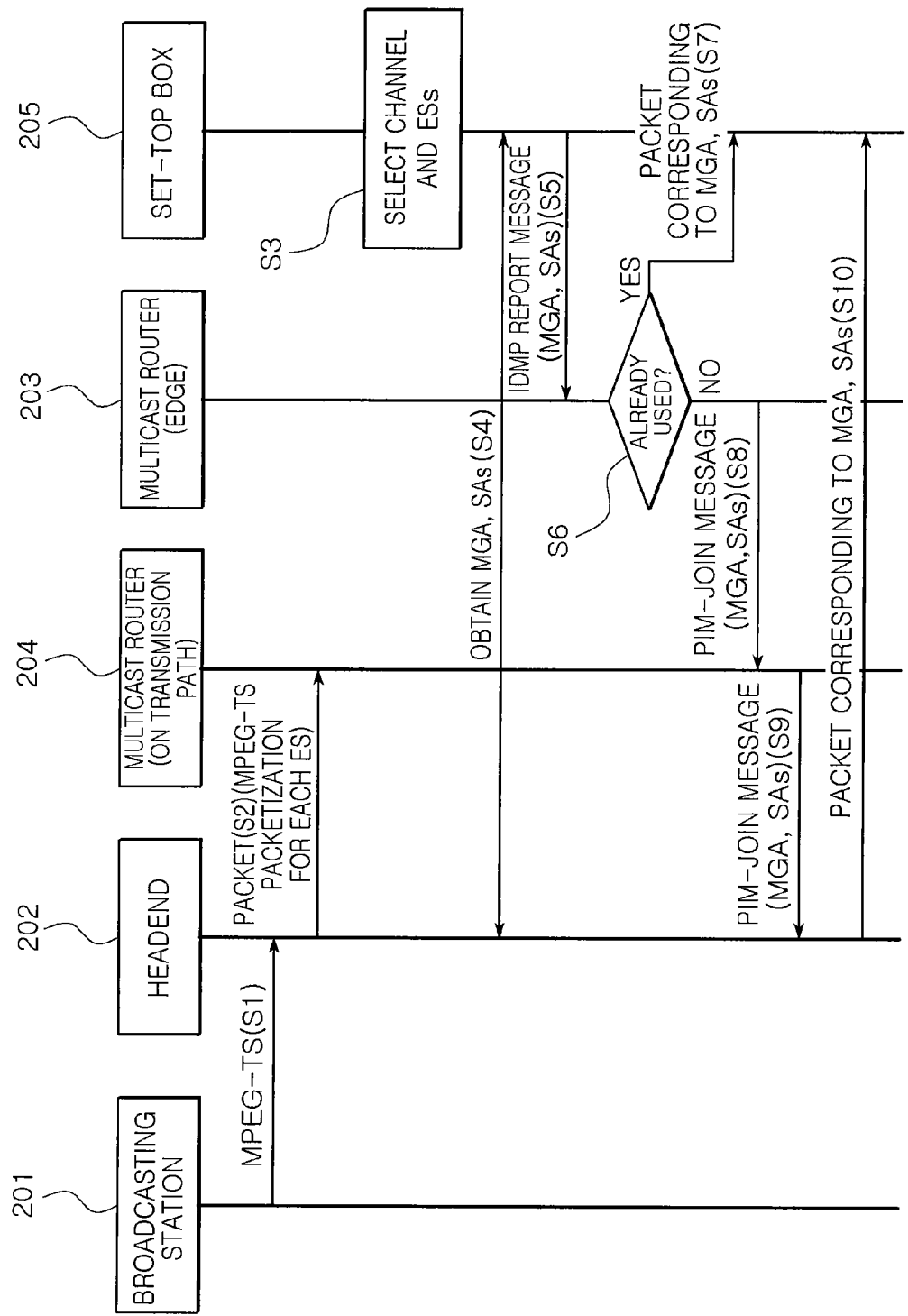
FIG. 7 is a view explaining an MPEG-TS multicast method in an IPTV service network according to an embodiment of the present invention.

FIG. 7 is a view explaining an MPEG-TS multicast method in an IPTV service network according to an embodiment of the present invention.

In operation S1, a broadcasting station 201 produces broadcasting data in the MPEG-TS format and transmits the MPEG-TS. In operation S2, a headend 202 packetizes the MPEG-TS for each PID and outputs the packetized MPEG-TS.

In this state, when a user selects a channel and its elementary streams (ESs) to receive in operation S3, the set-top box 205 obtains a multicast group address (MGA) corresponding to the selected channel and source addresses (SAs) corresponding to the elementary streams in operation S4, and then generates and outputs an IGMP report message in operation S5.

In operation S6, an edge router 203 that has received the IGMP report message analyzes the received IGMP report message to obtain a channel selected by the user and an address pair of an MGA and SAs corresponding to the elementary stream to receive, and then checks whether the address pair is used by another set-top box.

In operation S7, when the address pair of the MGA and SAs is used by another set-top box, the edge router 203 identifies that the edge router 203 is located on a multicast tree for receiving packetized MPEG-TS corresponding to the address pair of the MGA and SAs already. Also, the edge router 203 enables only a transmission path to the set-top box 205 and delivers the corresponding data to the set-top box 205.

Meanwhile, in operation S8, when the address pair is new one, the edge router 203 generates a PIM-join message including the addresses MGA and SAs and transmits the PIM-join message to a multicast router 204 located on a transmission path in a direction of the source.

In operation S9, the multicast router 204 on the transmission path forms a multicast tree from the headend 202 to the edge router 203 while relaying the PIM-join message such that the PIM-join message reaches the headend 202.

Accordingly, in operation S10, the edge router 203 receives the packetized MPEG-TS corresponding to the address pair of an MGA and SAs through the multicast tree formed through the operation S9, and delivers the MPEG-TS to the set-top box 205.

According to the above-described present invention, in the case of a multi-angle service where video output from each camera forms into one ES, the headend assigns one multicast group address to an entire program, and assigns one source address to a video ES from each camera. In the case of changing a camera to be displayed on a screen according to a user's request, the set-top box sets a multicast group address of an IGMP report message as a multicast group address assigned to a corresponding channel, and changes a source address into the corresponding source address to a video stream of the selected camera.

Through the above process, only necessary video signals of video signals of the multi-angle program are delivered through a network.

This method can be likewise applied to a bilingual service where a plurality of audio signals are formed into one ES respectively and carried on one channel.

Also, in the case of a mosaic EPG according to the conventional art, due to limitation of a bandwidth, one mosaic EPG channel aggregates the limited number of channels. For this reason, when the number of channels provided by broadcaster exceeds the number of channels that can be displayed on one screen, a number of EPG channels are required to provide a mosaic EPG for all channels.

Therefore, in the conventional art, the set-top box is forced to request to change the MPEG-TSs to service an entire channel.

However, according to the present invention, in this case, an EPG channel for the entire channels can be formed using one MPEG-TS. That is, one multicast group address can be assigned to an entire EPG, and one source address can be assigned to each ES corresponding to an individual channel to be displayed as a cell on a screen.

Accordingly, even the personalized EPG service are provided, because one MPEG-TS can provide all channels and the set-top box can select channels to be displayed on the screen, a multicast method, which is not eligible in the conventional art, can be used.

As described above, the IPTV system and method for efficient multicast of an MPEG-TS according to the present invention assigns a virtual source address to ESs of the MPEG-TS transmitted by a broadcasting station, thereby allowing a set-top box to receive only elementary streams necessary for current service and allowing a consistent multicast transmission to be performed on a network.

Therefore, while services such as a multi-angle service, a multi-lingual service, a mosaic EPG service, and a personalized EPG service are realized in one multicast control method together with viewing of a general broadcasting channel, efficient use of a network bandwidth can be achieved.

Also, since the above functions are performed using a multicast control protocol already used, a consistent control can be performed.

While the present invention has been shown and described in connection with the exemplary embodiments, it will be apparent to those skilled in the art that modifications and variations can be made without departing from the spirit and scope of the invention as defined by the appended claims.

What is claimed is:

1. An Internet protocol television (IPTV) service system for efficient multicast of a motion picture expert group-transport stream (MPEG-TS) including a plurality of elementary streams, the system comprising:
   a headend configured to assign a multicast group address to each channel, assign a different source address to each packet identification (PID), and collect elementary streams corresponding to each PID to packetize the MPEG-TS into a plurality of IP packets for each channel;
   a set-top box configured to identify a user-selected channel and necessary elementary streams in the MPEG-TS for the selected channel, and request selective reception of IP packets corresponding to the selected channel and the necessary elementary streams from the plurality of IP packets; and
   a plurality of multicast routers configured to form a transmission path between the headend and the set-top box.

2. The system of claim 1, wherein the MPEG-TS corresponds to at least one channel, and comprises at least one of program and system information protocol (PSIP) data, video streams, audio streams, and data streams corresponding to respective PIDs.

3. The system of claim 2, wherein the headend assigns only one source address to tables of PSIP data comprising essential information for decoding the MPEG-TS, although the tables have different PIDs thereto.

4. The system of claim 2, wherein the headend performs the packetizing with a predefined packet length or a predefined time interval.

5. The system of claim 1, wherein each source address is reusable for a different channel.

6. The system of claim 1, wherein the set-top box obtains the multicast group address to join to a multicast group corresponding to the selected channel, and obtains source addresses corresponding to the necessary elementary streams in the MPEG-TS.

7. The system of claim 6, wherein the set-top box generates an Internet group management protocol (IGMP) report message having the multicast group address corresponding to the selected channel, and the source addresses corresponding to the necessary elementary streams to request data transmission.

8. The system of claim 1, wherein the plurality of multicast routers comprise:
   multicast routers on a transmission path forming the transmission path for a multicast group corresponding to the selected channel and the elementary streams; and an edge router for allowing the set-top box to join to the multicast group corresponding to the selected channel and the elementary streams.

9. The system of claim 1, wherein each of the IP packets includes a multicast group address assigned to each channel, a source address assigned to each PID and elementary streams collected for said each PID.

10. An Internet protocol television (IPTV) method for efficient multicast of a motion picture expert group-transport stream (MPEG-TS) including a plurality of elementary streams, the method comprising:

assigning, at a headend, a multicast group address to each channel, assigning a different source address to each packet identification (PID) and collecting elementary streams corresponding to each PID to packetize the MPEG-TS into a plurality of IP packets for each channel;

identifying, at a set-top box, a channel and necessary elementary streams selected by a user, and requesting joining to a multicast group corresponding to the selected channel and the necessary elementary streams;

setting, at multicast routers, a multicast path corresponding to the multicast group; and selectively receiving, at the set-top box, IP packets transmitted through the multicast path and corresponding to the selected channel and the necessary elementary streams.

11. The method of claim 10, wherein the MPEG-TS comprises at least one of program and system information protocol (PSIP), video streams, audio streams, and data streams corresponding to respective PIDs.

12. The method of claim 10, wherein the assigning of the different source address comprises assigning only one source address to tables of PSIP data comprising essential information for decoding the MPEG-TS, although the tables have different PIDs.

13. The method of claim 10, wherein each source address is reusable for a different channel.

14. The method of claim 10, wherein each of the IP packets includes a multicast group address assigned to each channel, a source address assigned to each PID and elementary streams collected for said each PID.

* * * * *